United States Patent
Wang et al.

(10) Patent No.: US 7,467,544 B2
(45) Date of Patent: Dec. 23, 2008

(54) BRAKE BOOSTER VACUUM SENSOR RATIONALITY CHECK

(75) Inventors: Zhong Wang, Westland, MI (US); Wenbo Wang, Novi, MI (US); Igor Anilovich, Walled Lake, MI (US); John F. Van Gilder, Webberville, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 260 days.

(21) Appl. No.: 11/389,567

(22) Filed: Mar. 24, 2006

(65) Prior Publication Data

US 2006/0288766 A1    Dec. 28, 2006

Related U.S. Application Data

(60) Provisional application No. 60/690,163, filed on Jun. 13, 2005.

(51) Int. Cl.
*G01M 17/00* (2006.01)
(52) U.S. Cl. ...................................................... 73/129
(58) Field of Classification Search .................. 73/121, 73/128, 129
See application file for complete search history.

(56) References Cited

U.S. PATENT DOCUMENTS

| | | | | |
|---|---|---|---|---|
| 5,705,744 A * | 1/1998 | Brugger et al. | ............... | 73/121 |
| 6,557,403 B1 * | 5/2003 | Kerns | ........................... | 73/121 |
| 6,741,918 B2 * | 5/2004 | Kerns et al. | .................... | 701/34 |
| 6,880,532 B1 * | 4/2005 | Kerns et al. | ................. | 123/494 |
| 6,880,533 B2 * | 4/2005 | Kerns et al. | ................. | 123/494 |
| 6,990,858 B2 * | 1/2006 | Kerns et al. | .................... | 73/129 |
| 7,076,347 B2 * | 7/2006 | Lehner et al. | .................. | 701/34 |
| 7,188,517 B2 * | 3/2007 | Kerns et al. | .................... | 73/121 |
| 7,267,412 B2 * | 9/2007 | Gronau et al. | ............ | 303/114.3 |
| 2001/0035166 A1 * | 11/2001 | Kerns et al. | ................. | 123/494 |
| 2003/0177822 A1 * | 9/2003 | Kerns | ........................ | 73/118.1 |
| 2004/0162652 A1 * | 8/2004 | Kerns et al. | ................... | 701/34 |
| 2005/0218716 A1 * | 10/2005 | Collins et al. | ............. | 303/115.3 |
| 2005/0231034 A1 * | 10/2005 | Kerns et al. | ................. | 303/191 |
| 2006/0049690 A1 * | 3/2006 | Collins et al. | ............. | 303/114.3 |

* cited by examiner

*Primary Examiner*—Eric S McCall

(57) ABSTRACT

A vacuum signal diagnostic system that diagnoses operation of a vacuum sensor of a brake booster system that is in fluid communication with an engine includes a first module that determines whether a vacuum signal of the vacuum sensor is increasing and a second module that compares an engine vacuum signal of the engine to the vacuum signal. A third module indicates a HI fault of the vacuum sensor when the vacuum sensor is increasing and a difference between the engine vacuum signal and the vacuum signal is greater than zero for a first threshold time.

28 Claims, 3 Drawing Sheets

BRAKE BOOSTER VACUUM SENSOR RATIONALITY CHECK

CROSS-REFERENCE TO RELATED APPLICATIONS

This application claims the benefit of U.S. Provisional Application No. 60/690,163, filed on Jun. 13, 2005. The disclosure of the above application is incorporated herein by reference.

FIELD OF THE INVENTION

The present invention relates to vehicles using brake booster vacuum sensors, and more particularly to a rationality check of a vacuum signal generated by the brake booster vacuum sensor.

BACKGROUND OF THE INVENTION

Vehicles systems can include an internal combustion engine that combusts an air and fuel mixture to produce drive torque. The drive torque is transmitted to a drivetrain to accelerate the vehicle. A brake system is also included and is operable to decelerate the vehicle by applying brake pressure to brakes. In some vehicle systems, a brake booster is provided to reduce braking effort. More specifically, the brake booster increases the force applied to a master cylinder of the brake system using a brake booster vacuum. The brake booster vacuum is generated in an intake manifold of the engine.

Some internal combustion engines include engine control systems that deactivate cylinders under low load situations. For example, an eight cylinder engine can be operated using four cylinders to improve fuel economy by reducing pumping losses. This process is generally referred to as displacement on demand (DOD). Operation using all of the engine cylinders is referred to as an activated mode. A deactivated mode refers to operation using less than all of the cylinders of the engine (one or more cylinders not active).

In the deactivated mode, there are fewer cylinders operating. Engine efficiency is increased as a result of decreased fuel consumption (i.e., by increasing single cylinder combustion efficiency for those activated cylinders) and decreased engine pump loss.

A brake booster vacuum sensor monitors the vacuum of the brake booster to ensure that adequate vacuum is available for braking. If brake booster vacuum falls below a predetermined threshold while in the deactivated mode, the engine is transitioned to the activated mode to increase the brake booster vacuum above the predetermined threshold. A faulty brake booster vacuum sensor may prevent the engine from transitioning to the deactivated mode and/or may cause the engine to cycle into and out of DOD mode in an undesirable manner. Therefore, operation of the brake booster vacuum sensor should be monitored to ensure that the brake booster vacuum sensor is generating a rationally accurate signal.

A traditional rationality diagnostic for the brake booster vacuum sensor includes determining a ratio between a minimum difference and a maximum difference of intake manifold vacuum and brake booster vacuum. This rationality diagnostic, however, is unable to detect all sensor failures. For example, the traditional rationality diagnostic is able to detect a close to zero reading failure, but is not able to accurately detect HI or LO signal drift failures (i.e., the sensor signal reads higher or lower than actual).

SUMMARY OF THE INVENTION

Accordingly, the present invention provides a vacuum signal diagnostic system that diagnoses operation of a vacuum sensor of a brake booster system that is in fluid communication with an engine. The vacuum signal diagnostic system includes a first module that determines whether a vacuum signal of the vacuum sensor is increasing and a second module that compares a an engine vacuum signal to the brake booster vacuum signal. A third module indicates a HI fault of the vacuum sensor when the brake booster vacuum signal is increasing and a difference between the engine vacuum signal and the brake booster vacuum signal is greater than zero for a first threshold time.

In another feature, the vacuum signal diagnostic system further includes a fourth module that determines whether a throttle of the engine is in a closed position. The first module determines whether a vacuum signal of the brake booster vacuum sensor is increasing is executed when the throttle is closed.

In another feature, the third module further determines a degree of HI drift of the brake booster vacuum signal. The vacuum signal is corrected based on the degree of HI drift.

In still another feature, the third module determines a total time the brake booster vacuum signal is increasing, determines a portion of the total time during which the brake booster vacuum signal is greater than the engine vacuum signal and calculates a ratio of the portion of said total time to said total time. The HI fault is indicated when the ratio is greater than a threshold ratio.

In yet other features, the third determines a degree of LO drift of the brake booster vacuum signal. The vacuum signal is corrected based on the degree of LO drift. The third module determines a total time the brake booster vacuum signal is not increasing, determines a portion of the total time during which the brake booster vacuum signal is less than the engine vacuum signal and calculates a ratio of the portion of the total time to the total time. The LO fault is indicated when the ratio is greater than a threshold ratio.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
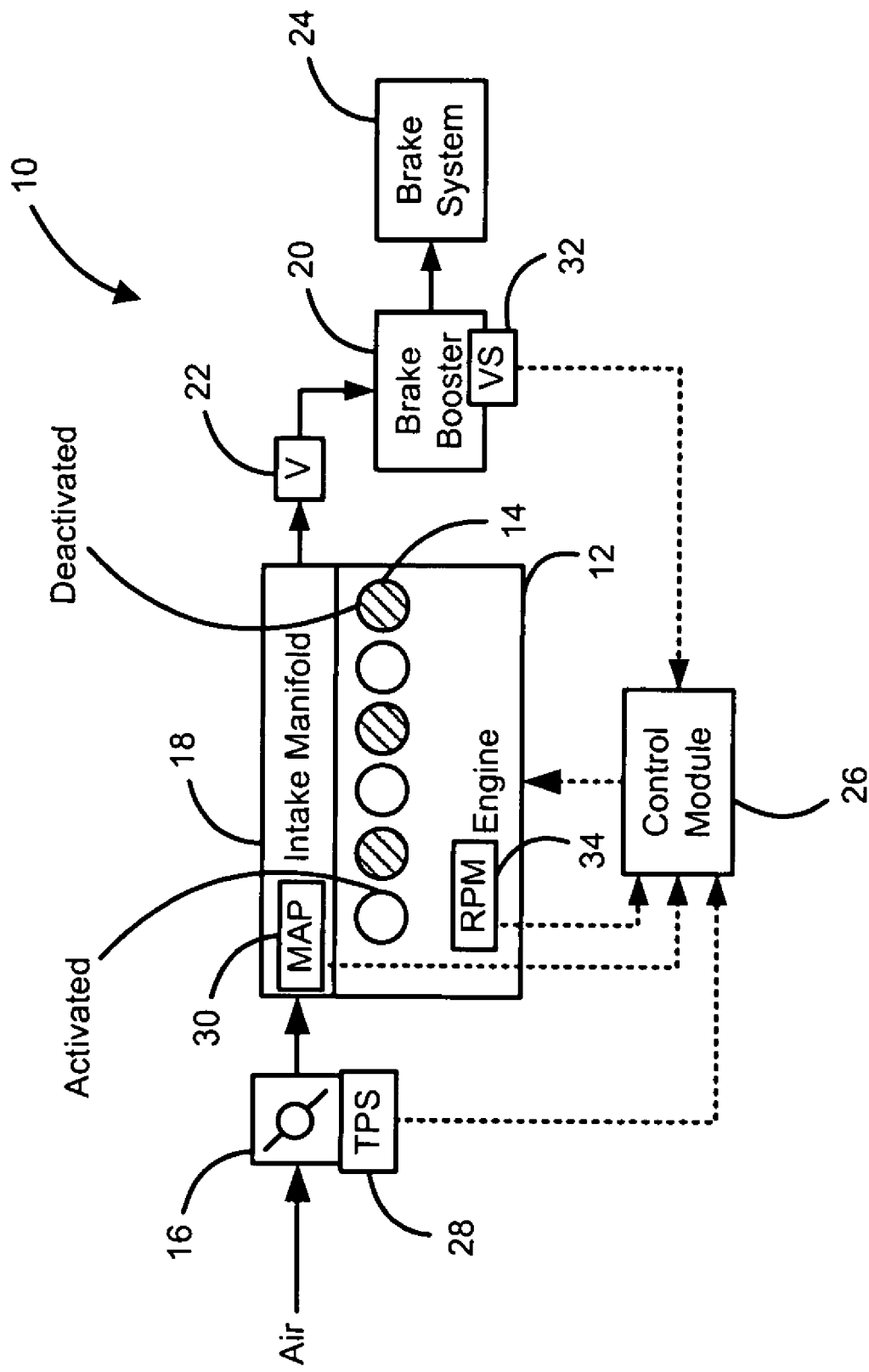
FIG. 1 is a functional block diagram of a vehicle system including a brake booster sensor diagnostic control according to the present invention.

The following description of the preferred embodiments is merely exemplary in nature and is in no way intended to limit the invention, its application, or uses. For purposes of clarity, the same reference numbers will be used in the drawings to identify similar elements. As used herein, an activated mode refers to operation of the engine using all of the engine cylinders. A deactivated mode refers to operation of the engine using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 that combusts and air and fuel mixture to generate drive torque. The engine 12 includes N cylinders 14 that are selectively deactivated during engine operation. Although six cylinders (N=6) are depicted in an in-line configuration, it can be appreciated that the engine 12 may include additional or fewer cylinders 14 in in-line, "V" or other configurations. For example, engines having 4, 5, 6, 8, 10, 12 and 16 cylinders are contemplated. Air flows into the engine 12 through a throttle 16 and an intake manifold 18 and is combusted with fuel in the cylinders 14. When operating in the deactivated mode, one or more of the intake and/or exhaust valves may be closed to reduce engine pumping losses.

The vehicle further includes a brake booster 20 and a brake system 24. The brake system 24 is operable to decelerate the vehicle 10 by providing a braking pressure to brakes (not shown). The brake booster 20 assists the brake system 24 by providing additional pressure to a master cylinder (not shown) of the brake system 24.

The brake booster 20 is in selective fluid communication with the engine 12 through a check valve 22. The brake booster 20 stores vacuum pressure or brake booster vacuum ($V_{BB}$) supplied by the engine 12 and selectively provides $V_{BB}$ to the brake system 24 to reduce braking effort. The check valve 22 may be a one-way valve that enables flow of air to the intake manifold 18 from the brake booster 20 when engine vacuum is greater than $V_{BB}$. Flow of pressurized air to the brake booster 20 from the intake manifold 18 is prohibited by the check valve 22. In this manner, $V_{BB}$ is maintained within the brake booster 20.

A control module 26 regulates operation of the engine 12 based on an operator input and various sensors signals discussed herein. A throttle position sensor (TPS) 28 generates a throttle position signal and a MAP sensor 30 generates a MAP signal. A brake booster vacuum sensor 32 generates a $V_{BB}$ signal. An engine speed sensor 34 generates an RPM signal. The control module 26 determines an engine load based on MAP and RPM. The control module 26 executes a brake booster diagnostic control, as described in further detail below.

During periods of light engine load, the control module 26 transitions engine operation to the deactivated mode and deactivates of one or more cylinders 14. In an exemplary embodiment, N/2 cylinders 14 are deactivated. Upon transitioning to the deactivated mode, the control module 26 communicates with the engine 12 to increase the power output of the remaining cylinders 14. When $V_{BB}$ falls below a threshold level (e.g., 42 kPA), the control module 26 transitions engine operation to the activated mode. In this manner, additional vacuum is generated in the intake manifold 18 to increase $V_{BB}$ above the threshold level.

The brake booster sensor diagnostic (BBSD) control of the present invention, monitors operation of the brake booster vacuum sensor 32 to determine whether the sensor is faulty. If the sensor is faulty, the brake booster sensor diagnostic control of the present invention identifies the cause of the fault (e.g., sensor signal drifting HI, sensor signal drifting LO). More specifically, the BBSD control monitors $V_{BB}$ (based on the brake booster sensor signal) and engine vacuum (based on the MAP sensor signal) while the throttle 16 is closed. In general, $V_{BB}$ follows engine vacuum when the throttle 16 is closed and there is no braking. Further, $V_{BB}$ is generally not much less than engine vacuum when the throttle 16 is closed and braking occurs, which depletes $V_{BB}$.

The BBSD control determines whether $V_{BB}$ is increasing and monitors a vacuum difference ($V_{DIFF}$) between $V_{BB}$ and engine vacuum. If $V_{DIFF}$ is greater than zero for a first threshold time ($t_{THRHI}$), the brake booster vacuum sensor signal is biased HI. If $V_{BB}$ is not increasing and $V_{DIFF}$ is less than a threshold for a second threshold time ($t_{THRLO}$), the brake booster vacuum sensor signal is biased LO. If the BBSD control determines that the brake booster vacuum sensor signal is biased HI or LO, a corresponding fault is indicated. In this manner, a service technician can identify the fault and replace or repair the faulty brake booster vacuum sensor. It is further anticipated that the BBSD control can determine the degree to which the brake booster vacuum sensor signal drifts and can correct the signal based on the amount of drift. In this manner, although the brake booster vacuum sensor 32 is faulty, it does not need to be immediately replaced or repaired.

It is anticipated that the BBSD control of the present invention can implement an exponentially weighted moving average (EWMA) of the diagnostic variables to determine whether the brake booster sensor is faulty. In the case where the signal drifts HI, the BBSD control monitors the total time during which $V_{BB}$ increases while at zero throttle position ($t_{INC}$). The BBSD control also monitors the abnormal time where $V_{BB}$ is greater than engine vacuum ($t_{ABNHI}$). A HI EWMA ($EWMA_{HI}$) is calculated as the filtered ratio between $t_{ABNHI}$ and $t_{INC}$. In other words, $EWMA_{HI}$ indicates the portion of time that $V_{BB}$ read higher than engine vacuum over the total time $V_{BB}$ was increasing. If the brake booster vacuum sensor signal does not drift HI, $EWMA_{HI}$ goes close to zero. If the sensor signal drifts HI, $EWMA_{HI}$ will go close to one. As a result, a degree of HI drift can be determined based on how close $V_{BB}$ is to engine vacuum. The brake booster vacuum sensor signal can be corrected based on the degree of HI drift.

In the case where the signal drifts LO, the BBSD control monitors the total time during which $V_{BB}$ is not increasing ($t_{NONINC}$) and the abnormal time ($t_{ABNLO}$) during which $V_{BB}$ is a calibrated threshold ($THR_{CAL}$) below engine vacuum. A LO EWMA ($EWMA_{LO}$) is calculated as the filtered ratio between $t_{ABNLO}$ and $t_{NONINC}$. In other words, $EWMA_{LO}$ indicates the portion of time that $V_{BB}$ was below $THR_{CAL}$ below engine vacuum over the total time $V_{BB}$ was not increasing. If the brake booster vacuum sensor signal does not drift LO, $EWMA_{LO}$ goes close to zero. If the sensor signal drifts LO, $EWMA_{LO}$ will go close to one. As a result, a degree of LO drift can be determined based on how close $V_{BB}$ is to engine vacuum. The brake booster vacuum sensor signal can be corrected based on the degree of LO drift.

It is anticipated that $THR_{CAL}$ can be adjusted based on a vehicle deceleration rate. More specifically, $THR_{CAL}$ is determined based on whether the deceleration rate of the vehicle indicates medium or heavy duty brakes. For example, in the case of heavy duty brakes, $THR_{CAL}$ is larger than it would be for medium duty brakes. It is further anticipated that the BBSD control can determine whether the sensor signal is stuck in a particular range by monitoring variations (i.e., depleting or incrementing) in $V_{BB}$ while at zero throttle position and brakes applied. For example, if $V_{BB}$ does not move while at zero throttle position with brakes applied, the sensor signal is stuck.

Figure 2:
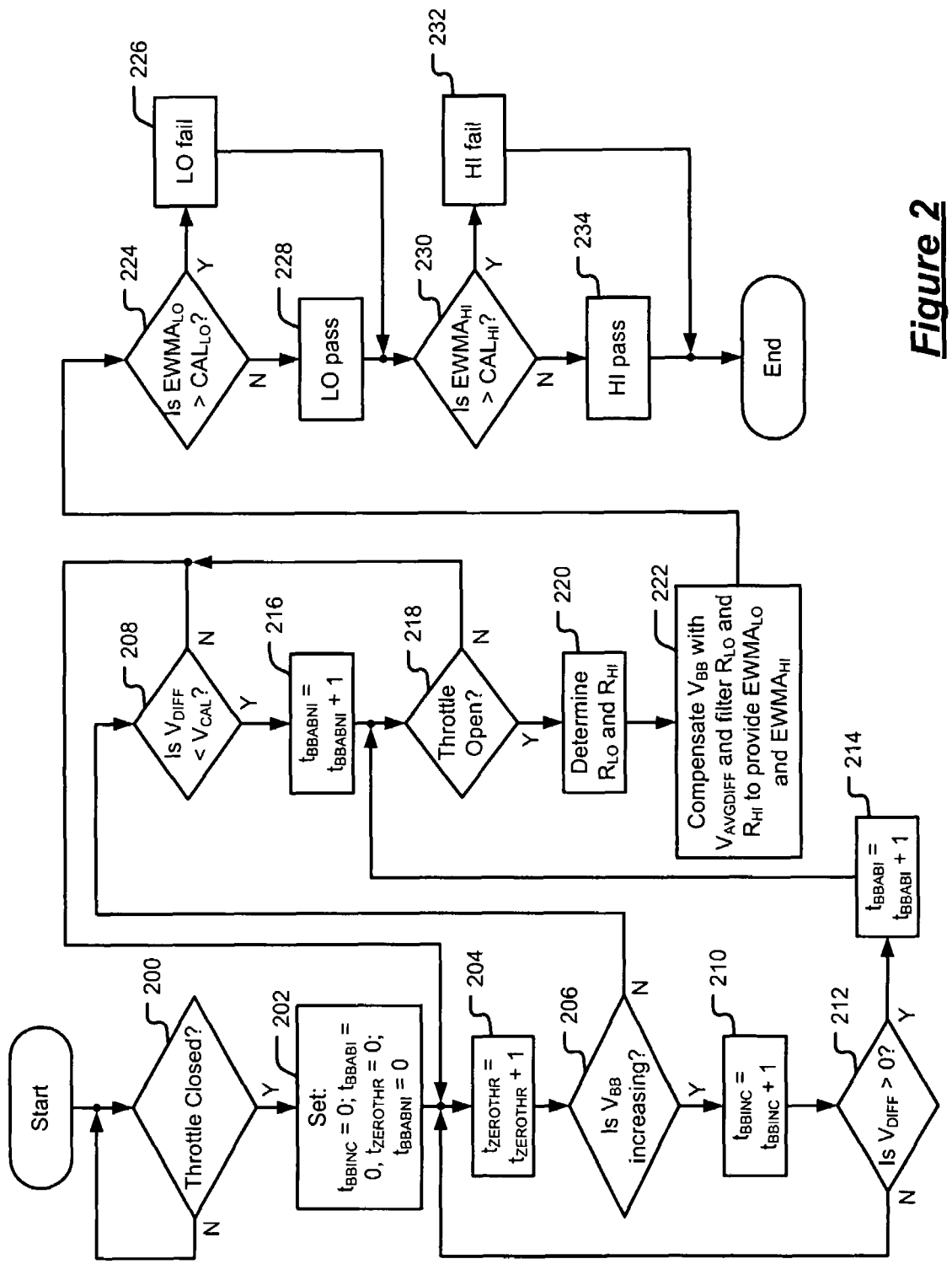
FIG. 2 is a flowchart illustrating exemplary steps executed by the brake booster sensor diagnostic control of the present invention.

Referring now to FIG. 2, exemplary steps executed by the BBSD control will be described in detail. In step 200, control determines whether the throttle 16 is closed. If the throttle 16 is not closed, control loops back. In step 202, control sets a brake booster vacuum increase timer ($t_{BBINC}$), a brake booster abnormal increase timer ($t_{BBABI}$), a throttle closed timer ($t_{ZEROTHR}$) and a brake booster vacuum abnormal non-increasing timer ($t_{BBABNI}$) each equal to zero. In step 204, control increments $t_{ZEROTHR}$ by a time increment dt.

In step 206, control determines whether $V_{BB}$ is increasing. If $V_{BB}$ is not increasing, control continues in step 208. If $V_{BB}$ is increasing, control continues in step 210. In step 210, control determines whether $V_{DIFF}$ is greater than zero. If $V_{DIFF}$ is not greater than zero, control loops back to step 204. If $V_{DIFF}$ is greater than zero, control increments $t_{BBABI}$ by dt in step 214 and continues in step 218.

In step 208, control determines whether $V_{DIFF}$ is less than $V_{CAL}$. If $V_{DIFF}$ is not less than $V_{CAL}$, control loops back to step 204. If $V_{DIFF}$ is less than $V_{CAL}$, control increments $t_{BBABNI}$ by dt in step 216. In step 218, control determines whether the throttle is open. If the throttle is not open, control loops back to step 204. If the throttle is open, control determines $R_{LO}$ and $R_{HI}$ in step 220. $R_{LO}$ and $R_{HI}$ are time ratios that are determined based on the following relationships:

$$R_{LO} = t_{BBABNI}/(t_{ZEROTHR} - t_{BBINC})$$

$$R_{HI} = t_{BBABI}/t_{BBINC}$$

In step 222, control compensates $V_{BB}$ based on an average of $V_{DIFF}$ ($V_{AVGDIFF}$) and filter both $R_{LO}$ and $R_{HI}$ to update $EWMA_{LO}$ and $EWMA_{HI}$, respectively. In step 224, control determines whether $EWMA_{LO}$ is greater than a calibratable LO threshold ($CAL_{LO}$). If $EWMA_{LO}$ is greater than $CAL_{LO}$, control indicates a LO fail status in step 226 and continues in step 230. If $EWMA_{LO}$ is not greater than $CAL_{LO}$, control indicates a LO pass status in step 228 and continues in step 230. In step 230, control determines whether $EWMA_{HI}$ is greater than a calibratable HI threshold ($CAL_{HI}$). If $EWMA_{HI}$ is greater than $CAL_{HI}$, control indicates a HI fail status in step 232 and control ends. If $EWMA_{HI}$ is not greater than $CAL_{HI}$, control indicates a HI pass status in step 234 and control ends.

Figure 3:
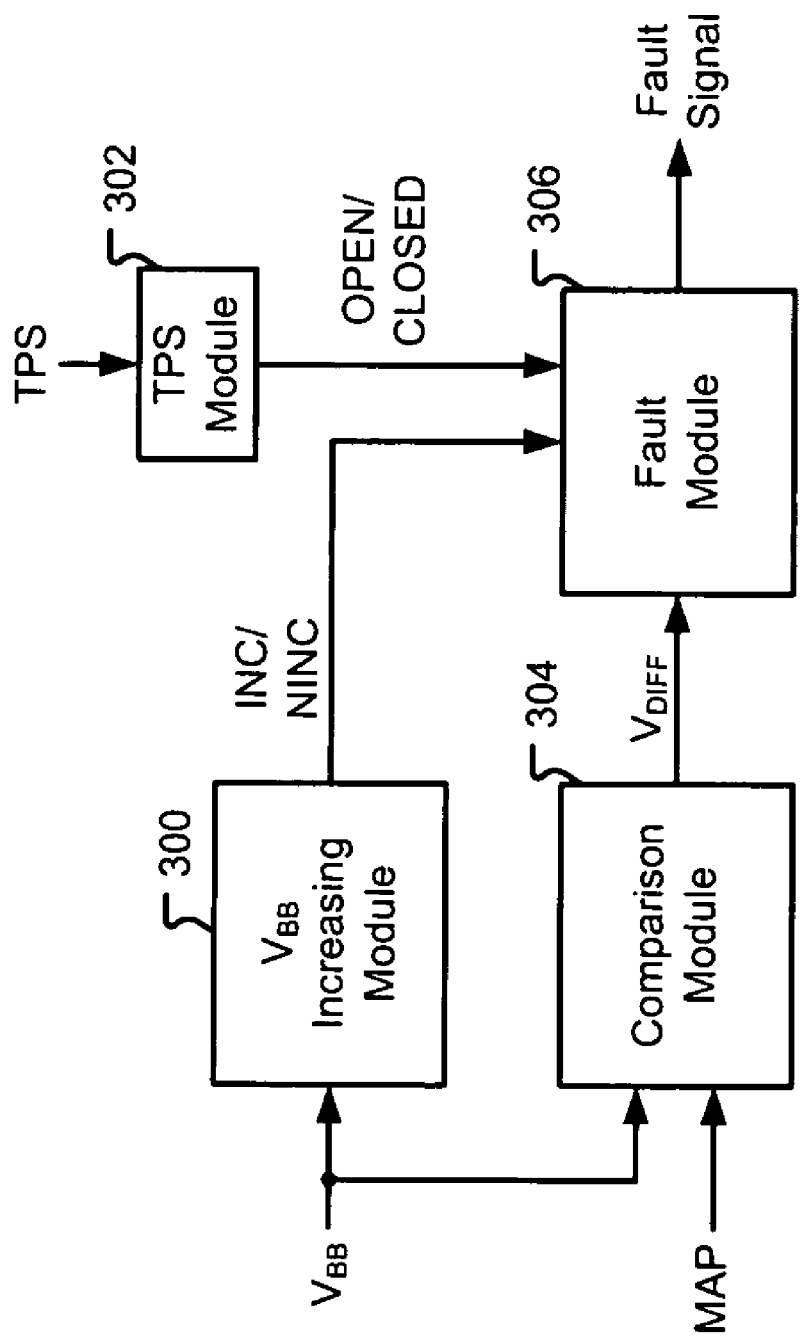
FIG. 3 is a functional block diagram of exemplary modules that execute the brake booster diagnostic control of the present invention.

Referring now to FIG. 3, exemplary modules of the brake booster diagnostic system of the present invention will be described in detail. The exemplary modules include a $V_{BB}$ increasing module 300, a TPS module 302, a comparison module 304 and a fault module 306. The $V_{BB}$ increasing module 300 determines whether $V_{BB}$ is increasing (INC) or not increasing (NINC) based on $V_{BB}$. The TPS module 302 determines whether the throttle 16 is open or closed. The comparison module 304 compares $V_{BB}$ and MAP to provide $V_{DIFF}$. The fault module 306 selectively generates a fault signal (e.g., HI fault, LO fault) based on $V_{DIFF}$, INC/NINC and OPEN/CLOSED.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A vacuum signal diagnostic system that diagnoses operation of a brake booster vacuum sensor of a brake booster system that is in fluid communication with an engine, comprising:

a first module that determines whether a vacuum signal of said vacuum sensor is increasing;

a second module that compares an engine vacuum signal of said engine to said vacuum signal; and a third module that indicates a HI fault of said vacuum sensor based on said determination that said vacuum signal is increasing and a difference between said engine vacuum signal and said vacuum signal is greater than zero for a first threshold time.

2. The vacuum signal diagnostic system of claim 1 further comprising a fourth module that determines whether a throttle of said engine is in a closed position, wherein said first module determines whether a vacuum signal of said vacuum sensor is increasing is executed when said throttle is closed.

3. A vacuum signal diagnostic system that diagnoses operation of a brake booster vacuum sensor of a brake booster system that is in fluid communication with an engine, comprising:

a first module that determines whether a vacuum signal of said vacuum sensor is increasing;

a second module that compares an engine vacuum signal of said engine to said vacuum signal: and a third module that indicates a HI fault of said vacuum sensor when said vacuum sensor signal is increasing and a difference between said engine vacuum signal and said vacuum signal is greater than zero for a first threshold time, wherein said third module further determines a degree of HI drift of said vacuum signal, wherein said vacuum signal is corrected based on said degree of HI drift.

4. A vacuum signal diagnostic system that diagnoses operation of a brake booster vacuum sensor of a brake booster system that is in fluid communication with an engine, comprising:

a first module that determines whether a vacuum signal of said vacuum sensor is increasing:

a second module that compares an engine vacuum signal of said engine to said vacuum signal; and a third module that indicates a HI fault of said vacuum sensor when said vacuum sensor signal is increasing and a difference between said engine vacuum signal and said vacuum signal is greater than zero for a first threshold time, wherein said third module determines a total time said vacuum signal is increasing, determines a portion of said total time during which said vacuum signal is greater than said engine vacuum signal and calculates a ratio of said portion of said total time to said total time, wherein said HI fault is indicated when said ratio is greater than a threshold ratio.

5. A vacuum signal diagnostic system that diagnoses operation of a brake booster vacuum sensor of a brake booster system that is in fluid communication with an engine, comprising:

a first module that determines whether a vacuum signal of said vacuum sensor is increasing;

a second module that compares an engine vacuum signal of said engine to said vacuum signal; and a third module that indicates a HI fault of said vacuum sensor when said vacuum sensor signal is increasing and a difference between said engine vacuum signal and said vacuum signal is greater than zero for a first threshold time, wherein said third module indicates a LO fault of said vacuum sensor when said vacuum signal is not increasing and a difference between said engine vacuum signal and said vacuum signal is less than a calibrated value for a second threshold time.

6. The vacuum signal diagnostic system of claim 5 wherein said third module determines a degree of LO drift of said vacuum signal, wherein said vacuum signal is corrected based on said degree of LO drift.

7. The vacuum signal diagnostic system of claim 5 wherein said third module determines a total time said vacuum signal is not increasing, determines a portion of said total time during which said vacuum signal is less than said engine vacuum signal by a pre-determined amount and calculates a ratio of said portion of said total time to said total time, wherein said LO fault is indicated when said ratio is greater than a threshold ratio.

8. A method of diagnosing operation of a vacuum sensor of a brake booster system that is in fluid communication with an engine, comprising:
   determining whether a vacuum signal of said vacuum sensor is increasing;
   comparing an engine vacuum signal of said engine to said vacuum signal; and
   indicating a HI fault of said vacuum sensor based on said determination that said vacuum signal is increasing and a difference between a MAP signal and said vacuum signal is greater than zero for a first threshold time.

9. The method of claim 8 further comprising determining whether a throttle of said engine is in a closed position, wherein said determining whether a vacuum signal of said vacuum sensor is increasing is executed when said throttle is closed.

10. A method of diagnosing operation of a vacuum sensor of a brake booster system that is in fluid communication with an engine, comprising:
   determining whether a vacuum signal of said vacuum sensor is increasing;
   comparing an engine vacuum signal of said engine to said vacuum signal;
   indicating a HI fault of said vacuum sensor when said vacuum signal is increasing and a difference between a MAP signal and said vacuum signal is greater than zero for a first threshold time;
   determining a degree of HI drift of said vacuum signal; and
   correcting said vacuum signal based on said degree of HI drift.

11. A method of diagnosing operation of a vacuum sensor of a brake booster system that is in fluid communication with an engine, comprising:
   determining whether a vacuum signal of said vacuum sensor is increasing;
   comparing an engine vacuum signal of said engine to said vacuum signal;
   indicating a HI fault of said vacuum sensor when said vacuum signal is increasing and a difference between a MAP signal and said vacuum signal is greater than zero for a first threshold time;
   determining a total time said vacuum signal is increasing;
   determining a portion of said total time during which said vacuum signal is greater than said engine vacuum signal; and
   calculating a ratio of said portion of said total time to said total time, wherein said HI fault is indicated when said ratio is greater than a threshold ratio.

12. A method of diagnosing operation of a vacuum sensor of a brake booster system that is in fluid communication with an engine, comprising:
   determining whether a vacuum signal of said vacuum sensor is increasing;
   comparing an engine vacuum signal of said engine to said vacuum signal;
   indicating a HI fault of said vacuum sensor when said vacuum signal is increasing and a difference between a MAP signal and said vacuum signal is greater than zero for a first threshold time; and
   indicating a LO fault of said vacuum sensor when said vacuum signal is not increasing and a difference between said engine vacuum signal and said vacuum signal is less than zero for a second threshold time.

13. The method of claim 12 further comprising:
   determining a degree of LO drift of said vacuum signal; and
   correcting said vacuum signal based on said degree of LO drift.

14. The method of claim 12 further comprising:
   determining a total time said vacuum signal is not increasing;
   determining a portion of said total time during which said vacuum signal is less than said engine vacuum signal; and
   calculating a ratio of said portion of said total time to said total time, wherein said LO fault is indicated when said ratio is greater than a threshold ratio.

15. A vacuum signal diagnostic system that diagnoses operation of a vacuum sensor of a brake booster system that is in fluid communication with an engine, comprising:
   a first module that determines whether a vacuum signal of said vacuum sensor is increasing;
   a second module that compares an engine vacuum signal of said engine to said vacuum signal; and
   a third module that indicates a LO fault of said vacuum sensor based on said determination that said vacuum signal is not increasing and a difference between said engine vacuum signal and said vacuum signal is less than zero for a first threshold time.

16. The vacuum signal diagnostic system of claim 15 further comprising a fourth module that determines whether a throttle of said engine is in a closed position, wherein said first module determines whether a vacuum signal of said vacuum sensor is increasing is executed when said throttle is closed.

17. A vacuum signal diagnostic system that diagnoses operation of a vacuum sensor of a brake booster system that is in fluid communication with an engine, comprising:
   a first module that determines whether a vacuum signal of said vacuum sensor is Increasing;
   a second module that compares an engine vacuum signal of said engine to said vacuum signal;
   a third module that indicates a LO fault of said vacuum sensor when said vacuum signal is not increasing and a difference between said engine vacuum signal and said vacuum signal is less than zero for a first threshold time,
wherein said third module further determines a degree of LO drift of said vacuum signal, wherein said vacuum signal is corrected based on said degree of LO drift.

18. A vacuum signal diagnostic system that diagnoses operation of a vacuum sensor of a brake booster system that is in fluid communication with an engine, comprising:
   a first module that determines whether a vacuum signal of said vacuum sensor is increasing;
   a second module that compares an engine vacuum signal of said engine to said vacuum signal; and
   a third module that indicates a LO fault of said vacuum sensor when said vacuum signal is not increasing and a difference between said engine vacuum signal and said vacuum signal is less than zero for a first threshold time,
wherein said third module determines a total time said vacuum signal is not increasing, determines a portion of said total time during which said vacuum signal is less than said engine vacuum signal and calculates a ratio of said portion of said total time to said total time, wherein said LO fault is indicated when said ratio is greater than a threshold ratio.

19. A vacuum signal diagnostic system that diagnoses operation of a vacuum sensor of a brake booster system that is in fluid communication with an engine, comprising:
- a first module that determines whether a vacuum signal of said vacuum sensor is increasing;
- a second module that compares an engine vacuum signal of said engine to said vacuum signal; and
- a third module that indicates a LO fault of said vacuum sensor when said vacuum signal is not increasing and a difference between said engine vacuum signal and said vacuum signal is less than zero for a first threshold time, wherein said third module indicates a HI fault of said vacuum sensor when said vacuum signal is increasing and a difference between said engine vacuum signal and said vacuum signal is greater than zero for a second threshold time.

20. The vacuum signal diagnostic system of claim 19 wherein said third module determines a degree of HI drift of said vacuum signal, wherein said vacuum signal is corrected based on said degree of HI drift.

21. The vacuum signal diagnostic system of claim 19 wherein said third module determines a total time said vacuum signal is increasing, determines a portion of said total time during which said vacuum signal is greater than said engine vacuum signal and calculates a ratio of said portion of said total time to said total time, wherein said HI fault is indicated when said ratio is greater than a threshold ratio.

22. A method of diagnosing operation of a vacuum sensor of a brake booster system that is in fluid communication with an engine, comprising:
- determining whether a vacuum signal of said vacuum sensor is increasing;
- comparing an engine vacuum signal of said engine to said vacuum signal; and
- indicating a LO fault of said vacuum sensor based on said determination that said vacuum signal is not increasing and a difference between said engine vacuum signal and said vacuum signal is less than zero for a first threshold time.

23. The method of claim 22 further comprising determining whether a throttle of said engine is in a closed position, wherein said determining whether a vacuum signal of said vacuum sensor is increasing is executed when said throttle is closed.

24. A method of diagnosing operation of a vacuum sensor of a brake booster system that is in fluid communication with an engine, comprising:
- determining whether a vacuum signal of said vacuum sensor is increasing;
- comparing an engine vacuum signal of said engine to said vacuum signal;
- indicating a LO fault of said vacuum sensor when said vacuum signal is not increasing and a difference between said engine vacuum signal and said vacuum signal is less than zero for a first threshold time;
- determining a degree of LO drift of said vacuum signal; and
- correcting said vacuum signal based on said degree of LO drift.

25. A method of diagnosing operation of a vacuum sensor of a brake booster system that is in fluid communication with an engine, comprising:
- determining whether a vacuum signal of said vacuum sensor is increasing;
- comparing an engine vacuum signal of said engine to said vacuum signal;
- indicating a LO fault of said vacuum sensor when said vacuum signal is not increasing and a difference between said engine vacuum signal and said vacuum signal is less than zero for a first threshold time;
- determining a total time said vacuum signal is increasing;
- determining a portion of said total time during which said vacuum signal is greater than said engine vacuum signal; and
- calculating a ratio of said portion of said total time to said total time, wherein said LO fault is indicated when said ratio is greater than a threshold ratio.

26. A method of diagnosing operation of a vacuum sensor of a brake booster system that is in fluid communication with an engine, comprising:
- determining whether a vacuum signal of said vacuum sensor is increasing;
- comparing an engine vacuum signal of said engine to said vacuum signal;
- indicating a LO fault of said vacuum sensor when said vacuum signal is not increasing and a difference between said engine vacuum signal and said vacuum signal is less than zero for a first threshold time; and
- indicating a HI fault of said vacuum sensor when said vacuum signal is increasing and a difference between said engine vacuum signal and said vacuum signal is greater than zero for a second threshold time.

27. The method of claim 26 further comprising:
- determining a degree of HI drift of said vacuum signal; and
- correcting said vacuum signal based on said degree of HI drift.

28. The method of claim 26 further comprising:
- determining a total time said vacuum signal is increasing;
- determining a portion of said total time during which said vacuum signal is greater than said engine vacuum signal; and
- calculating a ratio of said portion of said total time to said total time, wherein said HI fault is indicated when said ratio is greater than a threshold ratio.

* * * * *